United States Patent [19] [11] 3,728,487
Hata [45] Apr. 17, 1973

[54] AUTOMATIC TELEPHONE RESPONDING AND RECORDING SYSTEM

[75] Inventor: Kiyoshi Hata, Kobe, Japan

[73] Assignee: Funai Electric Company, Limited, Osaka, Japan

[22] Filed: Nov. 9, 1970

[21] Appl. No.: 87,746

[52] U.S. Cl. ....................179/6 R
[51] Int. Cl. ....................H04m 1/64
[58] Field of Search ....................179/6 R, 6 AC, 6 C

[56] References Cited

UNITED STATES PATENTS

| | | | |
|---|---|---|---|
| 3,586,779 | 6/1971 | Chernack | 179/6 R |
| 3,640,479 | 2/1972 | Hata | 179/6 R |
| 3,426,152 | 2/1969 | O'Halloran | 179/6 R |
| 3,127,474 | 3/1964 | Waldman | 179/6 R |
| 3,492,427 | 1/1970 | Foster | 179/6 AC |
| 2,793,253 | 5/1957 | Howey | 179/6 R X |

OTHER PUBLICATIONS

Spratt, Simple Telephone Answering Machine, Wireless World, 7/56, pp. 344–346, 179/6R

*Primary Examiner*—Raymond F. Cardillo, Jr.
*Attorney*—Eugene E. Geoffrey, Jr.

[57] ABSTRACT

A recording and reproducing system utilizing a magnetic tape having at least two individual recording tracks with magnetic heads associated with each of said tracks, a circuit responsive to the call signal of a telephone to activate the recording and reproducing systems so that a previously recorded message can be transmitted to the caller and at the same time the caller's message can be recorded.

3 Claims, 6 Drawing Figures

INVENTOR.
KIYOSHI HATA
BY Eugene E. Geoffrey Jr.
ATTORNEY

INVENTOR.
KIYOSHI HATA
BY
ATTORNEY

AUTOMATIC TELEPHONE RESPONDING AND RECORDING SYSTEM

This invention relates to an automatic telephone responding and recording system and, more particularly to a system for automatically reproducing a host's message which is previously recorded on a recording tape, in response to a call signal of a telephone, and imparting it to a guest, as well as, automatically recording a guest's message for future reproduction when the host is absent at that time.

Telephone answering systems have already been proposed, but such prior systems have had numerous disadvantages such as the use of a single track recording system wherein the recording tape has an alternate serial arrangement of first recording tracks in which the host's messages are previously recorded and second recording tracks in which the guest's messages are to be recorded. First, such systems require switching means for switching the operation of the system between recording and reproduction at the termination of each track which results in a very complicated and unreliable system. This is especially true when a specific call is expected and the conversation is to consist of several pre-recorded questions and several answers. Second, since that portion of the guest's message overlapping the host's message cannot be recorded, some technique is required of the guest and this frequently results in the loss of at least part of the guest's message.

Therefore, an object of this invention is to propose an automatic telephone responding and recording system which can record the both guest's and host's messages on the same recording track at the same time and in superimposed fashion on occasion without need of switching operations between recording and reproduction so that the recorded guest's and host's messages can be simultaneously reproduced for hearing.

According to this invention, a double track recording and reproducing system is adopted, and the first track is used for recording the host's message and the second track is used for recording the guest's message. The first and second tracks may be provided on a single magnetic recording tape in double track fashion or on separate magnetic recording tape in single track fashion. On the back of the magnetic recording tape having the first recording track there is a stop mark corresponding to the end of each conversation. This stop mark can be sensed by a sensing means which produces a stop signal in response to the stop mark. The recording and reproducing system is composed of a reproducing channel having a magnetic reproducing head facing the first recording track and a recording channel having a magnetic recording head facing the second recording track. The system of this invention also includes a call signal receiving terminal and a conversation terminal which are to be respectively connected to the call signal channel and the conversation channel of the telephone, a call signal processing channel normally connected to the call signal terminal for generating an output in response to a call signal of the telephone, a tape driving means, a first relay responding to the output of the call signal processing channel to connect the reproducing channel to both the conversation terminal and the recording channel and also connect the tape driving means to a power supply, and a second relay responding to the stop signal from the stop mark sensing means to disconnect the power supply from the tape driving means. In this system, the relays are energized only once during each conversation period and the both host's and guest's messages are recorded together in the second recording track.

Other objects and features of this invention will be best understood by reading the following detailed description in conjunction with its several embodiments with reference to the accompanying drawings.

In the drawings.

Throughout the drawings, like reference numerals are used to denote like structural components.

Figure 1:
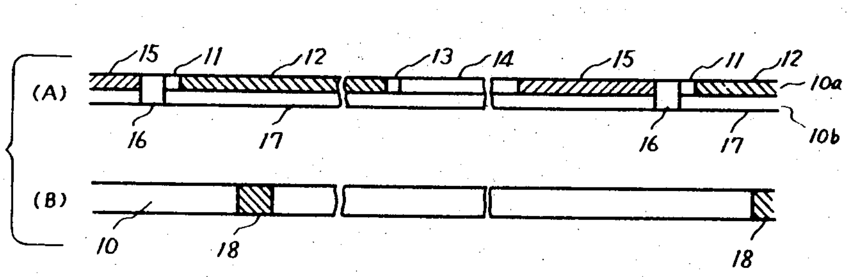
FIG. 1(A) is a schematic view representing a double track magnetic recording tape in accordance with the invention.
FIG. 1(B) is a schematic view representing the back face of the magnetic recording tape shown in FIG. 1(A)

Referring now to FIG. 1, there shown is a double track type magnetic recording tape 10, as an example, used in an embodiment of the device according to this invention. The magnetic tape 10 has a first recording track 10*a* having a portion 11 used for the indication of the number of the conversation, a shadowed portion 12 containing a host's message, a portion 13 containing a start-of-recording signal such as a buzzer sound, a blank portion 14 the length of which is approximately equal to the length of the guest recording on track 10*b*, a second shadowed portion 15 containing another host's message indicating the end of the conversation and a portion 16 constituting that portion of the tape which is displaced because of the inertia of the driving mechanism after disabling the driving means. The train of recording portions containing messages and information as described above is repeated for the number of calls anticipated. The second recording track 10*b* is wholly devoted to a recording portion 17 for successively recording the host's and guest's message.

On the back face (FIG. 1B) of the magnetic recording tape 10 there are stop marks 18, which may be tin foil adhered thereto, corresponding to the portions 16. The displacement between the portions 16 and 18 corresponds to the distance between the reproducing head and the stop mark sensing means.

Figure 2:
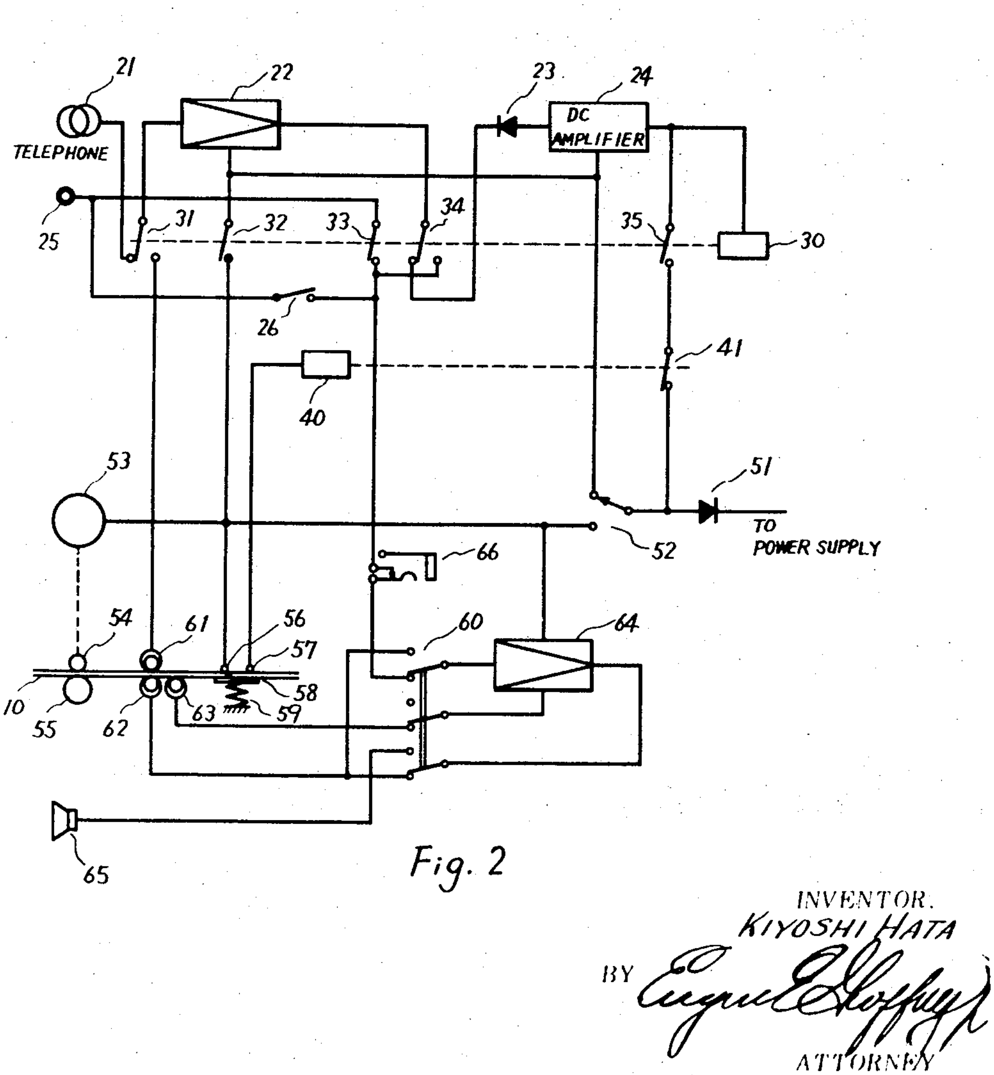
FIG. 2 is a schematic circuit diagram representing an embodiment of the system of this invention.

FIG. 2 shows an embodiment of the present inventive system using a magnetic recording tape 10 of the type shown in FIG. 1. A call signal receiving terminal 21 is normally connected to a call signal processing channel consisting of an amplifier 22, a diode 23 and a DC amplifier 24 through one set of contacts of each of two single pole double throw switches 31 and 34 which are driven by an electromagnetic relay 30 together with normally open single pole single throw switches 32, 33, and 35. The relay 30 is energized by the output of the DC amplifier 24. The other contact of the switch 31 is directly connected to a magnetic reproducing head 61 and the other contact of the switch 34 is connected through the switch 33 to a conversation terminal 25 of the telephone and is also connected to a recording channel consisting of a three pole double throw switch 60, an amplifier 64, a magnetic recording head 62 and an erasing head 63. The arrangement of the heads in the drawing is for the purpose of simplification of the drawing and it should be noted that the reproducing head 61 is arranged in the same side of the magnetic tape 10 as the recording head 62 and the erasing head 63 so as to face the first recording track. When the switch 60 is moved from the illustrated position to its other position, the recording head 62 is connected through the amplifier 64 to a speaker 65 and serves as a reproducing head for reproducing the recorded messages.

The magnetic tape 10 is driven by a tape driving means consisting of a motor 53, a capstan 54 and a pinch roller 55. The power supply is normally connected through a diode 51 and one contact of a single pole double throw switch 52 to the amplifiers 22 and 24, and is also connected to the motor 53, the amplifier 64 and one contact 56 of a stop mark sensing means when the normally open switch 32 is closed. The stop mark sensing means also includes another contact 57 which is connected to a relay 40 which drives a normally closed switch 41. The switch 41 is connected in series with the switch 35 between the power supply and the relay 30. As clearly understood from the drawing, the switch 35 serves a function of maintaining energization of the relay 30 and the switch 41 serves a function of deenergizing the relay.

The magnetic tape 10 is pressed against the contacts 56 and 57 by a pressure plate 58 urged by a spring 59 so that the stop mark 18 (FIG. 1) made of tin foil short-circuits the both contacts to energize the relay 40 when the stop mark engages the contacts. The other contact of the switch 52 is directly connected to the motor 53, the contact 56 and the amplifier 64. A hand-operated normally open switch 26 is inserted between the conversation terminal 25 and the recording channel. The recording channel is also provided with a microphone connector 66.

In order to set the system of FIG. 2 in its activated condition, the double throw switches 52 and 60 are set in the illustrated positions and the operating voltage is applied to the amplifiers 22 and 24. When the telephone rings in this condition, the call signal picked up from the call signal receiving terminal 21 is applied to the amplifiers 22 and 24 through the switches 31 and 34 and amplified to produce an output. The relay 30 is driven by this output to change the contacts of the switches 31 and 34 to the opposite (righthand) positions and close the normally open switches 32, 33, and 35. The relay 30 is self-sustained by the switch 35 until the normally closed switch 41 is opened.

In this condition, an operational voltage is applied from the power supply through the switch 32 to the motor 53 and the amplifier 64 and the motor 53 begins to drive the magnetic recording tape 10. At the same time, the magnetic reproducing head 61 begins to read out the host's message recorded in the first recording track **10*a* (FIG. 1) of the tape 10 and to transmit it to the guest through the switch 31, amplifier 22, switches 34 and 33 and the conversation terminal 25. This host's message is also applied by the switch 34 through the switch 60 and the amplifier 64 to the magnetic recording head 62 and recorded on the second recording track 10*b* (FIG. 1) of the tape 10**.

With the circuit in the condition described above, the guest's message is received from the conversation terminal 25, transferred through the switches 33 and 60 and the amplifier 64 to the magnetic recording head 62 and recorded on the second recording track **10*b*** following the recording of the host's message.

When the conversation period is ended and the stop mark 18 (FIG. 1) reaches the contacts 56 and 57 to short-circuit them, the relay 40 is energized to open the normally closed switch 41. Thus, the relay 30 is disconnected from the power supply and de-energized, and the switches 31 and 32, 33 34, and 35 return to their initial positions as shown in the drawing. Due to opening of the switch 32, the motor 53 stops driving the tape 10 and the relay 40 is de-energized to close the switch 41. The magnetic tape 10 moves somewhat due to the inertia of the motor and the stop mark 18 moves from engagement the contacts 56 and 57. Thus the system returns completely to its initial condition.

When the double throw switches 60 and 52 are changed to the opposite positions, the recorded guest's message can be reproduced through the magnetic head 62, amplifier 64 and speaker 65, together with the recorded host's message.

When the normally open switch 26 is closed and the double throw switch 52 is changed to the opposite position, the contents of a telephone conversation can be recorded at any time regardless of the stop marks. Moreover, if a microphone is attached to the microphone jack 66, this magnetic recording and reproducing system can be used as a conventional tape recorder.

Figure 3:
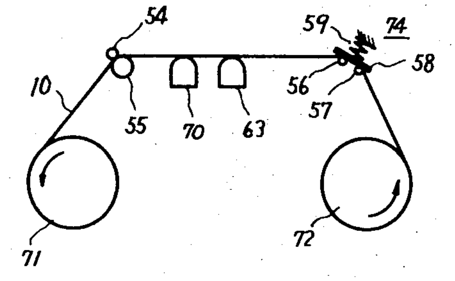
FIG. 3 is a schematic view representing a tape arrangement utilized in the embodiment of FIG. 2.

FIG. 3 shows a tape arrangement of the system using a double track type recording tape as shown in FIG. 1. The tape 10 is fed from a feed reel 72 to a winding reel 71 through stop mark sensing means 74 composed of contacts 56 and 57, pressure plate 58 and spring 59, an erasing head unit 63, a recording and reproducing head unit 70, a capstan 54 and a pinch roller 55. The units 63 and 70 are of the double track type each having two magnetic heads.

Figure 4:
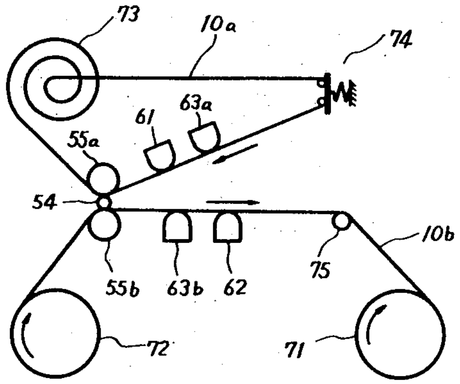
FIG. 4 is a schematic view representing another embodiment of a tape arrangement which may be utilized in the device of FIG. 2.

A feature of this invention is that the recording tracks **10*a* and 10*b* (FIG. 1) can be formed on separate magnetic tapes. One of such embodiment is shown in FIG. 4. The tape 10*a* is a single track endless magnetic recording tape on which a host's message is previously recorded, and the tape 10*b* is a conventional single track recording tape used for recording guest's messages. The tapes 10*a* and 10*b* are driven by a common capstan 54. The tape 10*a* is fed from an endless tape reel 73 through stop mark sensing means 74, an erasing head 63*a*, a reproducing head 61 and a pinch roller 55*a* back to the endless tape reel 73. The tape 10*b* is fed from a feed reel 72 through a pinch roller 55*b*, an erasing head 63*b*, a recording head 62 and a tension roller 75 to a winding reel 71**.

According to the embodiment of FIG. 4, if the length of the endless magnetic tape 10*a* is selected appropriately so as to correspond to the period of a conversation, it is unnecessary to record it repeatedly as shown in FIG. 1(A). Moreover, the recorded message can be reproduced by any conventional tape recorder and also stored separately from the endless tape 10*a*.

Figure 5:
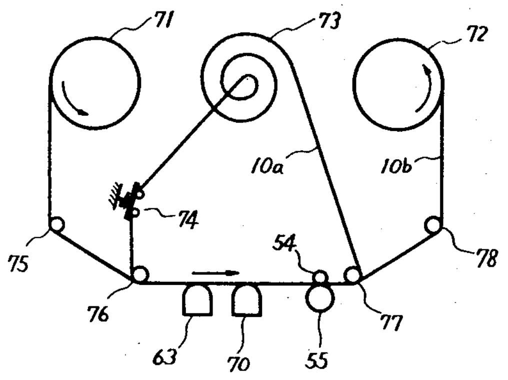
FIG. 5 is a schematic view representing still another embodiment of a tape arrangement which may be utilized in the device of FIG. 2.
Figure 6:
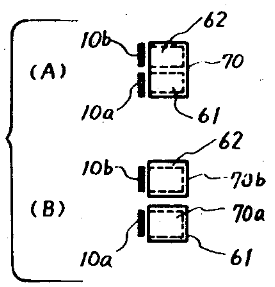
FIGS. 6(A) and 6(B) are schematic views representing two types of magnetic head arrangements which may be used in the device of FIG. 5.

FIG. 5 shows a modification of the arrangement of FIG. 4, which is arranged so that tape cassettes can be used. A single track endless magnetic tape 10*a* and a regular magnetic recording tape 10*b* are placed in overlying relationship and driven by a common capstan 54. The both tapes are positioned facing an erasing head unit 63 and a recording and reproducing head unit 70 and are guided by guide rollers 75, 76, 77, and 78. The tapes 10*a* and 10*b* may be of half width and contained in a common tape cassette or may be of full width and contained in separate tape cassettes. In the former case, the unit 70 may be a two channel type magnetic recording and reproducing head assembly including a magnetic recording head 62 and a magnetic reproducing head 61, as shown in FIG. 6(A). In the latter case, however, it is convenient to use separate magnetic recording and reproducing head units 70*b* and 70*a*, as shown in FIG. 6(B). When it is necessary to store the recorded messages, the use of separate tape cassettes is highly recommended.

The above embodiments are shown only for illustrative purposes, and many other modifications can be used without departing from the spirit and scope of this invention. The amplifiers used in the various channels may be of any suitable type or may be omitted according to circumstances. For example, it has been found that the guest's message can be recorded directly without use of any amplifier and this results in good noise characteristics. The call signal receiving terminal 21 and the conversation terminal 25 may be not only connected directly to the telephone circuitry but may also be coupled indirectly through an induction coil, microphone, speaker or other intermediate elements. Moreover, the stop mark 18 (FIG. 1) may be sensed photoelectrically or magnetically.

What is claimed is:

1. An automatic telephone responding and recording system comprising a call receiving terminal for connection to the call signal channel of a telephone, a conversation terminal for connection to the conversation channel of said telephone, a call signal processing channel including an amplifier having an input and an output, connections between said input and said call receiving terminal, a first magnetic recording tape having a pre-recorded outgoing message and at least one stop mark thereon, a second magnetic recording tape for recording incoming messages, a reproducing channel including a magnetic head for reproducing said pre-recorded message, a magnetic recording channel including a magnetic recording head cooperating with said second magnetic recording tape, relay means connected to the output of said call signal processing channel and operable in response to a call to switch said amplifier to connect the input thereof to said magnetic reproducing channel and the output to said conversation terminal and to the input of a second amplifier in said magnetic recording channel, magnetic tape driving means including a single capstan interconnected with said relay means and activated upon receipt of a call to drive both magnetic tapes, sensing means co-operating with said first magnetic tape and activated by said stop mark to stop said driving means and reset said relay, and housing means carrying said magnetic tapes for transport in substantially coplanar relationship.

2. An automatic telephone system according to claim 1 wherein said first magnetic tape is an endless tape.

3. An automatic telephone system according to claim 2 wherein said magnetic recording and reproducing heads are disposed within a single housing.

* * * * *